US 11,788,470 B2

(12) United States Patent
Rambo et al.

(10) Patent No.: US 11,788,470 B2
(45) Date of Patent: Oct. 17, 2023

(54) GAS TURBINE ENGINE THERMAL MANAGEMENT

(71) Applicant: General Electric Company, Schenectady, NY (US)

(72) Inventors: Jeffrey Douglas Rambo, Mason, OH (US); Brandon Wayne Miller, Liberty Township, OH (US); Kevin Robert Feldmann, Mason, OH (US); Patrick Michael Marrinan, Cincinnati, OH (US); Robert Jon McQuiston, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/188,668

(22) Filed: Mar. 1, 2021

(65) Prior Publication Data

US 2022/0275757 A1    Sep. 1, 2022

(51) Int. Cl.
*F02C 7/18* (2006.01)
*F01D 25/12* (2006.01)
*F02C 7/14* (2006.01)

(52) U.S. Cl.
CPC .............. *F02C 7/185* (2013.01); *F01D 25/12* (2013.01); *F02C 7/14* (2013.01);
(Continued)

(58) Field of Classification Search
CPC .. F02C 7/14; F02C 7/185; F02C 7/224; F01D 25/12; F05D 2220/323; F05D 2260/213;
(Continued)

(56) References Cited

U.S. PATENT DOCUMENTS 2,571,166 A    10/1951    Rossetto
2,711,074 A     6/1955    Howard
(Continued)

FOREIGN PATENT DOCUMENTS

EP    1149998 A2    10/2001
EP    1154135 A2    11/2001
(Continued)

OTHER PUBLICATIONS

MTU Aero Engines, Industrial Gas Turbines, LM6000 Series, 3 Pages. Retrieved Jan. 4, 2021 from https://www.mtu.de/engines/industrial-gas-turbines/lm-series/lm6000/.

*Primary Examiner* — Craig Kim
(74) *Attorney, Agent, or Firm* — Dority & Manning, P.A.

(57) ABSTRACT

A method is provided of controlling a cooled cooling air system for an aeronautical gas turbine engine. The method includes: receiving data indicative of an ambient condition of the aeronautical gas turbine engine, data indicative of a deterioration parameter of the aeronautical gas turbine engine, data indicative of an operating condition of the aeronautical gas turbine engine, or a combination thereof; and modifying a cooling capacity of the cooled cooling air system in response to the received data indicative of the ambient condition of the aeronautical gas turbine engine, data indicative of the deterioration parameter of the aeronautical gas turbine engine, data indicative of an operating condition of the aeronautical gas turbine engine, or the combination thereof.

16 Claims, 7 Drawing Sheets

(52) U.S. Cl.
CPC .... *F05D 2220/323* (2013.01); *F05D 2260/20* (2013.01); *F05D 2270/112* (2013.01); *F05D 2270/301* (2013.01); *F05D 2270/3032* (2013.01)

(58) Field of Classification Search
CPC ........... F05D 2260/20; F05D 2270/112; F05D 2270/301; F05D 2270/3032
See application file for complete search history.

(56) References Cited

U.S. PATENT DOCUMENTS

| | | | |
|---|---|---|---|
| 3,043,560 A | 7/1962 | Varadi | |
| 3,522,008 A | 7/1970 | Defabaugh et al. | |
| 3,651,645 A | 3/1972 | Grieb | |
| 3,779,007 A | 12/1973 | Lavash | |
| 4,078,604 A | 3/1978 | Christi et al. | |
| 4,138,856 A | 2/1979 | Orlowski | |
| 4,199,975 A | 4/1980 | Schrock et al. | |
| 4,254,618 A | 3/1981 | Elovic | |
| 4,466,481 A | 8/1984 | Wilson et al. | |
| 4,546,605 A | 10/1985 | Mortimer et al. | |
| 4,571,935 A | 2/1986 | Rice | |
| 4,688,627 A | 8/1987 | Jean-Luc et al. | |
| 4,722,666 A | 2/1988 | Dennison et al. | |
| 5,074,109 A | 12/1991 | Mandet et al. | |
| 5,297,386 A | 3/1994 | Kervistin | |
| 5,305,616 A | 4/1994 | Coffinberry | |
| 5,408,965 A | 4/1995 | Fulton et al. | |
| 5,414,992 A | 5/1995 | Glickstein | |
| 5,544,700 A | 8/1996 | Shagoury | |
| 5,619,855 A | 4/1997 | Burrus | |
| 5,645,397 A | 7/1997 | Soechting et al. | |
| 5,680,767 A | 10/1997 | Lee et al. | |
| 5,697,209 A | 12/1997 | Wettstein | |
| 5,724,816 A | 3/1998 | Ritter et al. | |
| 5,782,076 A | 7/1998 | Huber et al. | |
| 5,802,841 A | 9/1998 | Maeda | |
| 5,819,525 A | 10/1998 | Gaul et al. | |
| 5,834,632 A | 11/1998 | Olender et al. | |
| 6,106,229 A | 8/2000 | Nikkanen et al. | |
| 6,217,758 B1 | 4/2001 | Lee | |
| 6,253,554 B1 | 7/2001 | Kobayashi et al. | |
| 6,484,508 B2 | 11/2002 | Rocklin et al. | |
| 6,487,863 B1 | 12/2002 | Chen et al. | |
| 6,502,403 B1 | 1/2003 | Tazaki et al. | |
| 6,553,753 B1 | 4/2003 | Payling et al. | |
| 6,578,362 B1 | 6/2003 | Coffinberry | |
| 6,584,778 B1 | 7/2003 | Griffiths et al. | |
| 6,612,114 B1* | 9/2003 | Klingels | F02C 7/18 60/785 |
| 6,672,072 B1 | 1/2004 | Giffin, III | |
| 7,607,307 B2 | 10/2009 | Bergholz | |
| 7,836,680 B2 | 11/2010 | Schwarz et al. | |
| 7,886,580 B2 | 2/2011 | Kumar et al. | |
| 8,261,593 B1 | 9/2012 | Sanders | |
| 8,291,748 B2 | 10/2012 | Kumar et al. | |
| 8,511,986 B2 | 8/2013 | Alvanos et al. | |
| 8,522,572 B2 | 9/2013 | Coffinberry et al. | |
| 8,585,358 B2 | 11/2013 | Matsuo et al. | |
| 8,591,102 B2 | 11/2013 | Frach et al. | |
| 8,596,036 B2 | 12/2013 | Hyde et al. | |
| 8,656,698 B1 | 2/2014 | Jansen et al. | |
| 8,747,055 B2 | 6/2014 | McCune et al. | |
| 8,776,866 B2 | 7/2014 | Cederberg et al. | |
| 8,943,827 B2 | 2/2015 | Prociw et al. | |
| 8,955,330 B2 | 2/2015 | Narcus et al. | |
| 9,200,855 B2 | 12/2015 | Kington et al. | |
| 9,328,978 B2 | 5/2016 | Appukuttan et al. | |
| 9,410,482 B2 | 8/2016 | Krautheim et al. | |
| 9,458,764 B2 | 10/2016 | Alecu et al. | |
| 9,474,186 B2 | 10/2016 | Campbell et al. | |
| 9,587,832 B2 | 3/2017 | Dierberger | |
| 9,739,546 B2 | 8/2017 | Bertilsson et al. | |
| 9,829,259 B2 | 11/2017 | Nyander et al. | |
| 9,951,721 B2 | 4/2018 | Kupratis et al. | |
| 9,995,314 B2 | 6/2018 | Miller et al. | |
| 10,100,736 B2 | 10/2018 | Niergarth et al. | |
| 10,260,419 B2 | 4/2019 | Cerny et al. | |
| 10,352,243 B2 | 7/2019 | Mizukami et al. | |
| 10,364,750 B2* | 7/2019 | Rambo | F02K 3/115 |
| 10,487,739 B2 | 11/2019 | Miller et al. | |
| 11,378,009 B2* | 7/2022 | Roberge | F02C 7/14 |
| 11,391,210 B2* | 7/2022 | Ribarov | F02C 7/14 |
| 2003/0035717 A1 | 2/2003 | Tiemann | |
| 2004/0221584 A1 | 11/2004 | Hoffmann et al. | |
| 2004/0255571 A1 | 12/2004 | Fetescu et al. | |
| 2005/0081529 A1 | 4/2005 | Bolis et al. | |
| 2005/0236139 A1 | 10/2005 | Konruff et al. | |
| 2006/0042223 A1 | 3/2006 | Walker et al. | |
| 2007/0022732 A1 | 2/2007 | Holloway et al. | |
| 2007/0084049 A1* | 4/2007 | Wang | B23P 6/002 29/889.22 |
| 2007/0157626 A1 | 7/2007 | Bergholz | |
| 2009/0134243 A1 | 5/2009 | Mount et al. | |
| 2009/0229812 A1 | 9/2009 | Pineo et al. | |
| 2010/0139288 A1 | 6/2010 | Rago | |
| 2010/0180571 A1 | 7/2010 | Zysman et al. | |
| 2010/0192593 A1 | 8/2010 | Brown et al. | |
| 2011/0150634 A1 | 6/2011 | Bajusz et al. | |
| 2011/0162387 A1 | 7/2011 | Chir et al. | |
| 2012/0111095 A1 | 5/2012 | Sheehan | |
| 2013/0036747 A1 | 2/2013 | Fuchs et al. | |
| 2013/0104564 A1 | 5/2013 | Arar | |
| 2013/0152601 A1* | 6/2013 | Bacic | F01D 11/24 60/782 |
| 2013/0186100 A1 | 7/2013 | Rhoden et al. | |
| 2013/0247587 A1 | 9/2013 | Lo | |
| 2014/0010639 A1 | 1/2014 | Snape et al. | |
| 2014/0123657 A1 | 5/2014 | Tham et al. | |
| 2014/0123675 A1 | 5/2014 | Tham et al. | |
| 2014/0205446 A1 | 7/2014 | Patsouris et al. | |
| 2014/0208768 A1* | 7/2014 | Bacic | F02C 7/185 415/178 |
| 2014/0230444 A1 | 8/2014 | Hao et al. | |
| 2014/0260340 A1 | 9/2014 | Vaisman et al. | |
| 2014/0271118 A1 | 9/2014 | Junod | |
| 2015/0000291 A1 | 1/2015 | Smith et al. | |
| 2015/0114611 A1 | 4/2015 | Morris et al. | |
| 2015/0125264 A1 | 5/2015 | Lighty et al. | |
| 2015/0308353 A1* | 10/2015 | Gardner | F02C 9/54 60/773 |
| 2016/0091262 A1 | 3/2016 | Chainer et al. | |
| 2016/0108814 A1 | 4/2016 | Schmitz | |
| 2016/0230658 A1 | 8/2016 | Hanlon et al. | |
| 2016/0326963 A1 | 11/2016 | Yamazaki | |
| 2016/0341126 A1 | 11/2016 | Kupratis et al. | |
| 2017/0022900 A1 | 1/2017 | Miller et al. | |
| 2017/0030266 A1 | 2/2017 | Cerny et al. | |
| 2017/0044984 A1 | 2/2017 | Pesyna et al. | |
| 2017/0114721 A1 | 4/2017 | Miller et al. | |
| 2017/0122206 A1 | 5/2017 | Niergarth et al. | |
| 2017/0130606 A1 | 5/2017 | Niergarth et al. | |
| 2017/0159566 A1 | 6/2017 | Sennoun et al. | |
| 2017/0167382 A1 | 6/2017 | Miller et al. | |
| 2017/0184027 A1 | 6/2017 | Moniz et al. | |
| 2017/0248333 A1 | 8/2017 | Varley et al. | |
| 2017/0260905 A1 | 9/2017 | Schmitz | |
| 2019/0128189 A1* | 5/2019 | Rambo | F02K 3/115 |
| 2019/0186269 A1* | 6/2019 | Grzelecki | F01D 5/082 |
| 2019/0218971 A1* | 7/2019 | Niergarth | F02C 9/18 |
| 2019/0383564 A1 | 12/2019 | Miller et al. | |
| 2020/0108937 A1 | 4/2020 | Behrens et al. | |
| 2020/0165982 A1 | 5/2020 | Smith et al. | |
| 2022/0145801 A1* | 5/2022 | McCurdy Gibson | F02C 3/22 |
| 2022/0213802 A1* | 7/2022 | Johnson | F02C 7/185 |
| 2022/0228488 A1* | 7/2022 | Kitagawa | F02C 7/185 |

FOREIGN PATENT DOCUMENTS

| | | |
|---|---|---|
| EP | 2418367 A1 | 2/2012 |
| EP | 3514349 A1 | 7/2019 |
| EP | 2969756 B1 | 3/2020 |

(56) References Cited

FOREIGN PATENT DOCUMENTS

| | | | |
|---|---|---|---|
| GB | 937826 | A | 9/1963 |
| GB | 1357112 | A | 6/1974 |
| GB | 1358076 | A | 6/1974 |
| GB | 2034822 | A | 6/1980 |
| GB | 2342693 | A | 4/2000 |
| JP | 4-37807 | U | 3/1992 |
| JP | H05332164 | A | 12/1993 |
| JP | H06323163 | A | 11/1994 |
| JP | H09310624 | A | 12/1997 |
| JP | H1035266 | A | 2/1998 |
| JP | 2002174458 | A | 6/2002 |
| KR | 20150061229 | A | 6/2015 |
| WO | WO 01/31181 | A1 | 5/2001 |
| WO | WO 02/38938 | A1 | 5/2002 |
| WO | WO2014/105327 | A1 | 7/2014 |
| WO | WO2015/105552 | A1 | 7/2015 |

\* cited by examiner

GAS TURBINE ENGINE THERMAL MANAGEMENT

FIELD

The present disclosure relates to a gas turbine engine thermal management system.

BACKGROUND

A gas turbine engine generally includes a turbomachine and a rotor assembly. Gas turbine engines, such as turbofan engines, may be used for aircraft propulsion. Turbine machine generally include in serial flow order a compressor section having one or more compressors, a combustion section, and a turbine section having one or more turbines. In the case of a turbofan engine, the rotor assembly may be configured as a fan assembly.

In order to maintain a temperature of the one or more turbines of the turbine section below a maximum operating temperature limit, at least certain gas turbine engines provide a flow of air from the compressor section to one or more components of the one or more turbines of the turbine section, bypassing the combustion section. However, using the airflow from the compressor section they reduce efficiency of the compressor section and therefore of the gas turbine engine. Accordingly, a gas turbine engine cooling system reducing the amount of airflow from the compressor section required to cool the turbine section would be useful.

BRIEF DESCRIPTION

Aspects and advantages of the invention will be set forth in part in the following description, or may be obvious from the description, or may be learned through practice of the invention.

In one exemplary aspect of the present disclosure, a method is provided of controlling a cooled cooling air system for an aeronautical gas turbine engine. The method includes: receiving data indicative of an ambient condition of the aeronautical gas turbine engine, data indicative of a deterioration parameter of the aeronautical gas turbine engine, data indicative of an operating condition of the aeronautical gas turbine engine, or a combination thereof; and modifying a cooling capacity of the cooled cooling air system in response to the received data indicative of the ambient condition of the aeronautical gas turbine engine, data indicative of the deterioration parameter of the aeronautical gas turbine engine, data indicative of an operating condition of the aeronautical gas turbine engine, or the combination thereof.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
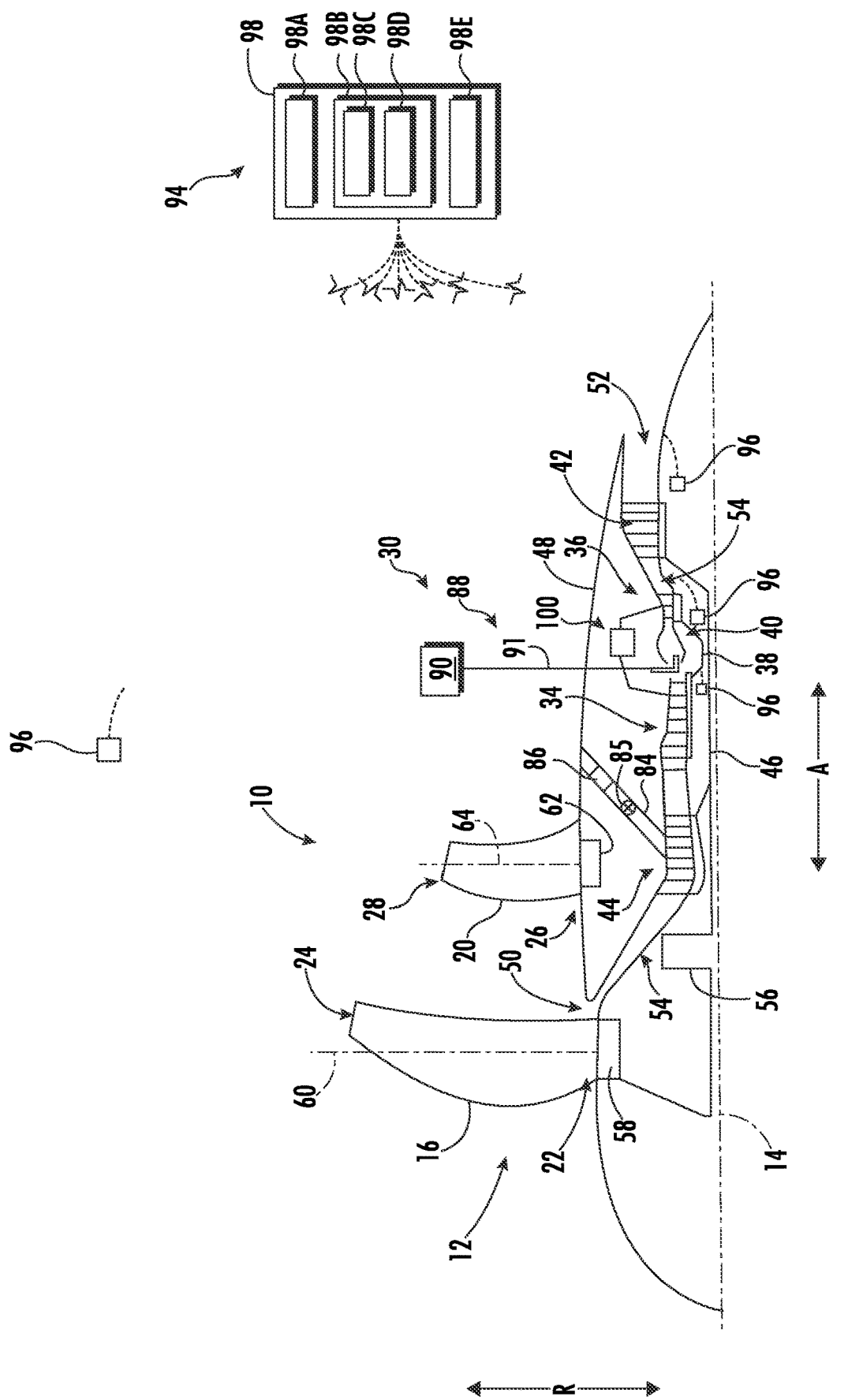
FIG. 1 is a cross-sectional view of a gas turbine engine in accordance with an exemplary aspect of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The present disclosure is generally related to a gas turbine engine having a cooled cooling air ("CCA") system for providing cooling air from a compressor section of the gas turbine engine to a turbine section gas turbine engine to maintain one or more components of the turbine section within a maximum operating temperature limit. The gas turbine engine is configured to modify the amount of cooling capacity the CCA system based on one or more parameters. Such may allow for the engine to reduce expending unnecessary cooling resources on the CCA system to result in a more efficient gas turbine engine.

For example, in certain exemplary aspects, the gas turbine engine is configured to receive data indicative of one or more ambient conditions of the aeronautical gas turbine engine, data indicative of a deterioration parameter of the aeronautical gas turbine engine, data indicative of an operating condition of the aeronautical gas turbine engine, data indicative of a failure condition of the aeronautical gas turbine engine, or a combination thereof. The gas turbine engine may be configured to modify the cooling capacity of the CCA system in response to this receive data.

In certain embodiments, modifying the cooling capacity of the CCA system may include modifying an amount of cooling available to the CCA system or modifying a cooling capacity of a CCA airflow provided by the CCA system (e.g., modifying a temperature and/or mass flowrate of the CCA airflow).

For example, the gas turbine engine may modify one or more cooling flows provided to a CCA heat exchanger of the CCA system. Additionally, or alternatively, if the CCA system is integrated into a thermal bus, the gas turbine engine may modify an amount of cooling fluid provided to a heat sink heat exchanger (which may cool a cooling fluid subsequently provided to the CCA heat exchanger), an amount of heating fluid provided to a heat source heat exchanger (reducing a heating of the cooling fluid subsequently provided to the CCA heat exchanger), an amount of the thermal fluid through the thermal bus provided to the CCA heat exchanger, or a combination thereof.

Further, in still other embodiments, modifying the cooling capacity of the CCA system may include switching out hardware components of the aeronautical gas turbine engine. For example, in certain exemplary aspects, modifying the amount of cooling available may include increasing a duct size of a cooling supply providing a flow of cooling fluid to the CCA system, increasing a heat exchanger size of the CCA heat exchanger, etc.

For example, it will be appreciated that based on ambient conditions for the engine and/or operating conditions of the engine, the amount of cooling required for the CCA system may change. Similarly, as the engine deteriorates and the compressor airflow provided to the CCA system increases for the same amount of engine power output, the amount of cooling required for the CCA system may increase. In such manner, it will be appreciated that a gas turbine engine incorporating one or more of these systems may operate more efficiently by only utilizing the necessary amount of cooling for the CCA system. Further, when the system and method of the present disclosure includes switching out hardware, such may result in a lighter aeronautical gas turbine engine during, e.g., an earlier portion of a lifespan of the engine.

Referring now to FIG. 1, a cross-sectional view of an exemplary embodiment of a gas turbine engine as may incorporate one or more inventive aspects of the present disclosure is provided. In particular, the exemplary gas turbine engine of FIG. 1 is a configured as a single unducted rotor engine 10 defining an axial direction A, a radial direction R, and a circumferential direction C. As is seen from FIG. 1, the engine 10 takes the form of an open rotor propulsion system and has a rotor assembly 12 which includes an array of airfoils arranged around a central longitudinal axis 14 of engine 10, and more particularly includes an array of rotor blades 16 arranged around the central longitudinal axis 14 of engine 10.

Moreover, as will be explained in more detail below, the engine 10 additionally includes a non-rotating vane assembly 18 positioned aft of the rotor assembly 12 (i.e., non-rotating with respect to the central axis 14), which includes an array of airfoils also disposed around central axis 14, and more particularly includes an array of vanes 20 disposed around central axis 14.

The rotor blades 16 are arranged in typically equally spaced relation around the centerline 14, and each blade has a root 22 and a tip 24 and a span defined therebetween. Similarly, the vanes 20 are also arranged in typically equally spaced relation around the centerline 14, and each has a root 26 and a tip 28 and a span defined therebetween. The rotor assembly 12 further includes a hub 44 located forward of the plurality of rotor blades 16.

Additionally, the engine 10 includes a turbomachine 30 having a core (or high pressure/high speed system) and a low pressure/low speed system. It will be appreciated that as used herein, the terms "speed" and "pressure" are used with respect to the high pressure/high speed system and low pressure/low speed system interchangeably. Further, it will be appreciated that the terms "high" and "low" are used in this same context to distinguish the two systems, and are not meant to imply any absolute speed and/or pressure values.

The core generally includes a high-speed compressor 34, a high speed turbine 36, and a high speed shaft 38 extending therebetween and connecting the high speed compressor 34 and high speed turbine 36. The high speed compressor 34, the high speed turbine 36, and the high speed shaft 38 may collectively be referred to as a high speed spool of the engine. Further, a combustion section 40 is located between the high speed compressor 34 and high speed turbine 36. The combustion section 40 may include one or more configurations for receiving a mixture of fuel and air, and providing a flow of combustion gasses through the high speed turbine 36 for driving the high speed spool.

The low speed system similarly includes a low speed turbine 42, a low speed compressor or booster, 44, and a low speed shaft 46 extending between and connecting the low speed compressor 44 and low speed turbine 42. The low speed compressor 44, the low speed turbine 42, and the low speed shaft 46 may collectively be referred to as a low speed spool of the engine.

Although the engine 10 is depicted with the low speed compressor 44 positioned forward of the high speed compressor 34, in certain embodiments the compressors 34, 44 may be in an interdigitated arrangement. Additionally, or alternatively, although the engine 10 is depicted with the high speed turbine 36 positioned forward of the low speed turbine 42, in certain embodiments the turbines 36, 42 may similarly be in an interdigitated arrangement.

Referring still to FIG. 1, the turbomachine 30 is generally encased in a cowl 48. Moreover, it will be appreciated that the cowl 48 defines at least in part an inlet 50 and an exhaust 52, and includes a turbomachinery flowpath 54 extending between the inlet 50 and the exhaust 52. The inlet 50 is for the embodiment shown an annular or axisymmetric 360 degree inlet 50 located between the rotor blade assembly 12 and the fixed or stationary vane assembly 18, and provides a path for incoming atmospheric air to enter the turbomachinery flowpath 54 (and compressors 44, 34, combustion section 40, and turbines 36, 42) inwardly of the guide vanes 28 along the radial direction R. Such a location may be advantageous for a variety of reasons, including management of icing performance as well as protecting the inlet 50 from various objects and materials as may be encountered in operation.

However, in other embodiments, the inlet 50 may be positioned at any other suitable location, e.g., aft of the vane assembly 18, arranged in a non-axisymmetric manner, etc.

Briefly, it will be appreciated that the engine 10 is generally configured as a "high bypass gas turbine engine. In such a manner, the engine 10 may define a bypass ratio of at least 6:1, such as at least 8:1, such as at least 10:1, such as at least 12:1, such as up to 28:1. As used herein, the term bypass ratio generally refers to a ratio of the airflow through the rotor assembly 12 that goes over the cowl 48 to the airflow that goes through the inlet 50. High bypass engines are generally designed for more efficient operation.

As is depicted, the rotor assembly 12 is driven by the turbomachine 30, and more specifically, is driven by the low speed spool. More specifically, still, engine 10 in the embodiment shown in FIG. 1 includes a power gearbox 56, and the rotor assembly 12 is driven by the low speed spool of the turbomachine 30 across the power gearbox 56. In such a manner, the rotating rotor blades 16 of the rotor assembly 12 may rotate around the axis 14 and generate thrust to propel engine 10, and hence an aircraft to which it is associated, in a forward direction.

The power gearbox 56 may include a gearset for decreasing a rotational speed of the low speed spool relative to the low speed turbine 42, such that the rotor assembly 12 may rotate at a slower rotational speed than the low speed spool.

As briefly mentioned above the engine 10 includes a vane assembly 18. The vane assembly 18 extends from the cowl 48 and is positioned aft of the rotor assembly 12. The vanes 20 of the vane assembly 18 may be mounted to a stationary frame or other mounting structure and do not rotate relative to the central axis 14. As shown in FIG. 1, the rotor assembly 12 is located forward of the turbomachine 30 in a "puller" configuration, and the exhaust 52 is located aft of the guide vanes 28. As will be appreciated, the vanes 20 of the vane assembly 18 may be configured for straightening out an airflow (e.g., reducing a swirl in the airflow) from the rotor assembly 12 to increase an efficiency of the engine 10. For example, the vanes 20 may be sized, shaped, and configured to impart a counteracting swirl to the airflow from the rotor blades 16 so that in a downstream direction aft of both rows of airfoils (e.g., blades 16, vanes 20) the airflow has a greatly reduced degree of swirl, which may translate to an increased level of induced efficiency.

Referring still to FIG. 1, it may be desirable that the rotor blades 16, the vanes 20, or both, incorporate a pitch change mechanism such that the airfoils (e.g., blades 16, vanes 20, etc.) can be rotated with respect to an axis of pitch rotation either independently or in conjunction with one another. Such pitch change can be utilized to vary thrust and/or swirl effects under various operating conditions, including to adjust a magnitude or direction of thrust produced at the rotor blades 16, or to provide a thrust reversing feature which may be useful in certain operating conditions such as upon landing an aircraft, or to desirably adjust acoustic noise produced at least in part by the rotor blades 16, the vanes 20, or aerodynamic interactions from the rotor blades 16 relative to the vanes 20. More specifically, for the embodiment of FIG. 1, the rotor assembly 12 is depicted with a pitch change mechanism 58 for rotating the rotor blades 16 about their respective pitch axes 60, and the vane assembly 18 is depicted with a pitch change mechanism 62 for rotating the vanes 20 about their respective pitch axes 64.

It will be appreciated, however, that the exemplary single rotor unducted engine 10 depicted in FIG. 1 is by way of example only, and that in other exemplary embodiments, the engine 10 may have any other suitable configuration, including, for example, any other suitable number of shafts or spools, turbines, compressors, etc.; fixed-pitch blades 16, 20, or both; a direct-drive configuration (i.e., may not include the gearbox 56); etc.

Additionally, or alternatively, in other exemplary embodiments, any other suitable gas turbine engine may be provided. For example, in other exemplary embodiments, the gas turbine engine may be a ducted turbofan engine, a turboshaft engine, a turboprop engine, turbojet engine, a mixed-flow turbofan or turbojet engine, etc. Moreover, for example, although the engine is depicted as a single unducted rotor engine, in other embodiments, the engine may include a multi-stage open rotor configuration, and aspects of the disclosure described hereinbelow may be incorporated therein.

Figure 2:
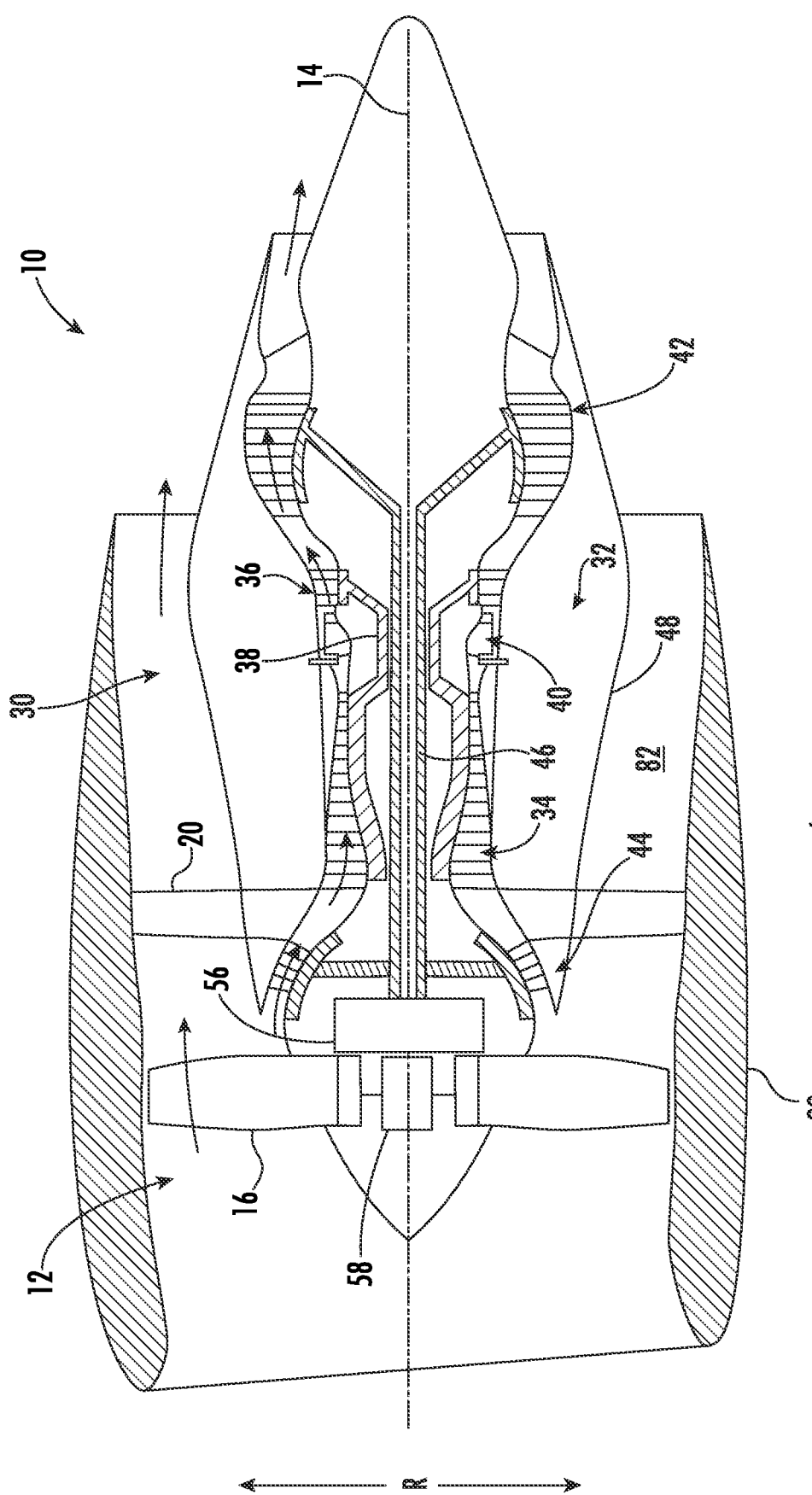
FIG. 2 is a cross-sectional view of a gas turbine engine in accordance with another exemplary aspect of the present disclosure.

Further, still, in other exemplary embodiments, the engine 10 may be configured as a ducted turbofan engine. For example, referring briefly to FIG. 2, an engine 10 in accordance with another exemplary embodiment of the present disclosure is depicted. The exemplary embodiment of FIG. 2 may be configured in substantially the same manner as the exemplary engine 10 described above with respect to FIG. 1, and the same or similar reference numerals may refer to the same or similar parts. However, as will be appreciated, for the embodiment shown, the engine 10 further includes a nacelle 80 circumferentially surrounding at least in part the rotor assembly 12 and turbomachine 30, defining a bypass passage 82 therebetween.

Referring now back to FIG. 1, it will further be appreciated that the exemplary engine 10 includes a duct 84 extending from the compressor to a bypass airflow over the cowl 48. In certain example embodiments, the duct 84 may be configured as a bleed airflow duct for bleeding off airflow from the compressor section during certain operations. Additionally, or alternatively, the duct 84 may be configured as a third stream. With such a configuration, the duct 84 may be an annular duct for providing additional airflow over the cowl 48 for producing additional thrust for the engine 10. Regardless, for the embodiment shown, the engine 10 further includes a valve 85 and a heat exchanger 86. The valve 85 may modulate an airflow through the duct 84. The heat exchanger 86 may be in thermal communication with the airflow through the duct 84.

Further, the exemplary engine 10 includes a fuel system 88. The fuel system 88 may generally include a fuel source 90 and one or more fuel lines 91. The one or more fuel lines 91 are configured to provide the flow of fuel from the fuel source 90 to the combustion section 40 of the engine 10.

Moreover, the exemplary gas turbine engine 10 is operably connected to a controller 94. The controller 94 may be an engine controller for the engine 10 (e.g., a Full Authority Digital Engine Control controller), may be an aircraft controller, may be a controller dedicated to the electric power system 100, etc.

The controller 94 may be configured to receive data indicative of various operating conditions and parameters of the engine 10 during operation of the engine 10. For example, as will be appreciated from FIG. 1, the engine 10 includes one or more sensors 96 configured to sense data indicative of various operating conditions and parameters of the engine 10, such as rotational speeds, temperatures, pressures, vibrations, etc. For example, the one or more sensors 96 may sense data indicative of a temperature parameter within the engine 10, such as an exhaust gas temperature, a turbine inlet temperature (measuring a temperature of an inlet to the first stage of turbine rotor blades, also referred to as "T41"), a compressor exit temperature (also referred to as "T3"), etc.

Additionally, or alternatively, the one or more sensors 96 may sense data indicative of a speed of the engine 10, such as a rotational speed of the low pressure system, a rotational speed of the high-pressure system, a rotational speed of the rotor section 12, etc. In such manner, the sensors 96 may sense data indicative of an operating condition of the engine, such as an operating mode (e.g., a takeoff operating mode, a climb operating mode, a cruise operating mode, a descent operating mode, etc.).

Further, for the embodiment shown, the one or more sensors 96 includes an ambient condition sensor for sensing data indicative of one or more ambient conditions, such as ambient temperature, ambient pressure, ambient altitude, etc.

It will be appreciated that the exemplary sensors 96 depicted in FIG. 1 are provided by way of example only. In other exemplary embodiments, the sensor(s) 96 may be positioned at any other suitable location, may include any other suitable number of sensors 96, and further may be configured to sense any other data.

In addition, as will be appreciated from the description herein, the controller 94 may also be configured to receive data form other sources, such as from an aircraft incorporating the engine, such as from one or more sensors of the aircraft incorporating the engine.

Referring particularly to the operation of the controller 94, in at least certain embodiments, the controller 94 can include one or more computing device(s) 98. The computing device(s) 98 can include one or more processor(s) 98A and one or more memory device(s) 98B. The one or more processor(s) 98A can include any suitable processing device, such as a microprocessor, microcontroller, integrated circuit, logic device, and/or other suitable processing device. The one or more memory device(s) 98B can include one or more computer-readable media, including, but not limited to, non-transitory computer-readable media, RAM, ROM, hard drives, flash drives, and/or other memory devices.

The one or more memory device(s) 98B can store information accessible by the one or more processor(s) 98A, including computer-readable instructions 98C that can be executed by the one or more processor(s) 98A. The instructions 98C can be any set of instructions that when executed by the one or more processor(s) 98A, cause the one or more processor(s) 98A to perform operations. In some embodiments, the instructions 98C can be executed by the one or more processor(s) 98A to cause the one or more processor(s) 98A to perform operations, such as any of the operations and functions for which the controller 94 and/or the computing device(s) 98 are configured, the operations for operating a gas turbine engine 10 (e.g., method 400), as described herein, and/or any other operations or functions of the one or more computing device(s) 98. The instructions 98C can be software written in any suitable programming language or can be implemented in hardware. Additionally, and/or alternatively, the instructions 98C can be executed in logically and/or virtually separate threads on processor(s) 98A. The memory device(s) 98B can further store data 98D that can be accessed by the processor(s) 98A. For example, the data 98D can include data indicative of power flows, data indicative of engine 10/aircraft operating conditions, and/or any other data and/or information described herein.

The computing device(s) 98 can also include a network interface 98E used to communicate, for example, with the other components of the engine 10, the aircraft incorporating the engine 10, the electric power system 100, etc. For example, in the embodiment depicted, as noted above, the engine 10 includes one or more sensors 96 for sensing data indicative of one or more parameters of the engine 10 and various accessory systems. The controller 94 is operably coupled to these components through, e.g., the network interface 98E, such that the controller 94 may receive data indicative of various operating parameters sensed by the one or more sensors 96 during operation, various operating conditions of the components, etc., and further may provide commands to control electrical flow of the electric power system 100 and other operating parameters of these systems, e.g., in response to the data sensed by the one or more sensors 96 and other conditions.

The network interface 98E can include any suitable components for interfacing with one or more network(s), including for example, transmitters, receivers, ports, controllers, antennas, and/or other suitable components. For example, in the embodiment shown, the network interface 98E is configured as a wireless communication network wirelessly in communication with these components (as is indicated by the dashed communication lines in FIG. 1).

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Figure 3:
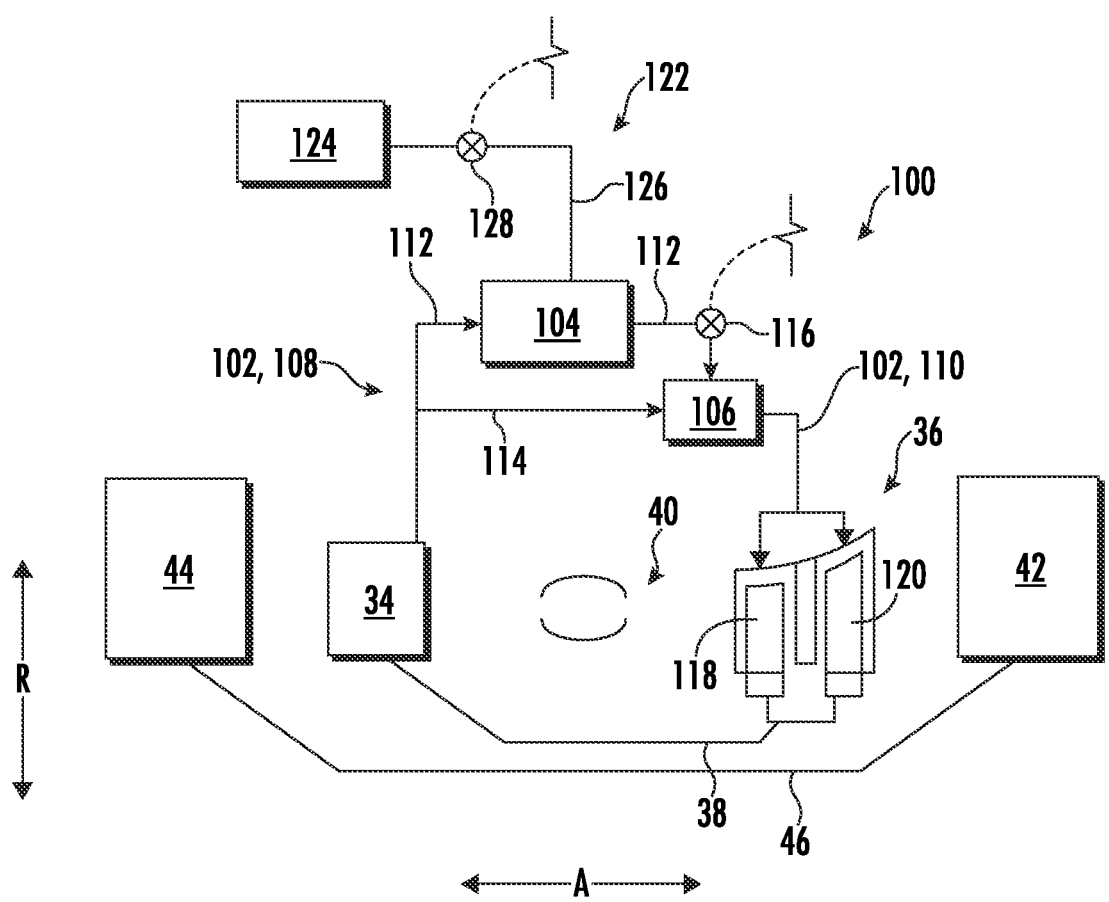
FIG. 3 is a close-up, schematic view of a cooled cooling air (CCA) system in accordance with an exemplary aspect of the present disclosure.

Referring still to FIG. 1, and now also to FIG. 3, providing a schematic view of the exemplary gas turbine engine 10 of FIG. 1, along with more details of an accessory system of the exemplary gas turbine engine 10 of FIG. 1, it will be appreciated that the exemplary gas turbine engine 10 further includes a cooled cooling air ("CCA") system.

The CCA system 100 generally includes a CCA duct 102 extending from the compressor section to the turbine section and a CCA heat exchanger 104. More specifically, the CCA duct 102 is configured to receive an airflow (a CCA airflow) from the high-pressure compressor 34, such as from a downstream stage of the high-pressure compressor 34, such as from an exit of the high-pressure compressor 34. In particular, for the embodiment shown, the CCA system 100 further includes a mixing chamber 106, and the CCA duct 102 includes an inlet section 108 and an outlet section 110. The inlet section 108 extends from the compressor section and further includes a first portion 112 extending to the CCA heat exchanger 104 and a second portion 114 extending to the mixing chamber 106. The first portion 112 of the inlet section 108 further extends from the CCA heat exchanger 104 to the mixing chamber 106. In such manner, it will be appreciated that the first portion 112 and the second portion 114 generally extend in parallel.

Within the CCA heat exchanger 104, the CCA airflow through the first portion 112 of the inlet section 108 of the CCA duct 102 is cooled, as will be explained in more detail below. The CCA airflow from the first portion 112 of the inlet section 108 and from the second portion 114 of the inlet section 108 are mixed together within the mixing chamber 106.

Briefly, for the embodiment shown, the CCA system 100 further includes an airflow valve 116 in fluid communication with the first portion 112 of the inlet section 108 for controlling a volume of CCA airflow through the first portion 112 of the inlet section 108 of the CCA duct 102. In such a manner, the airflow valve 116 may control a volume and/or temperature of the CCA airflow provided through the CCA duct 102 to the turbine section. The airflow valve 116 may be operably coupled to the controller 94 described above with reference to FIG. 1. In such a manner, the airflow valve 116 may control a cooling capacity of the CCA airflow provided to, e.g., the turbine section.

The CCA duct 102 is further configured to provide the CCA airflow to the turbine section. More specifically, for the embodiment shown, the CCA duct 102 further includes the outlet section 110 extending to the turbine section from, for the embodiment shown, the mixing chamber 106. The outlet section 110 of the CCA duct 102 is configured to deliver the CCA airflow to the turbine section. Specifically, as is shown schematically in FIG. 3, the high-pressure turbine generally includes a first stage of turbine rotor blades and a second stage of turbine rotor blades. The outlet section 110 of the CCA duct 102 is configured to deliver the CCA airflow to the first stage 118 of turbine blades of the high-pressure turbine 36, as well as to a second stage 120 of turbine rotor blades of the high-pressure turbine 36.

It will be appreciated that the exemplary CCA system 100 depicted in FIG. 3 is provided by way of example only. For example, although the exemplary CCA system 100 is depicted extending from the compressor section to the turbine section at a location outward of the combustion section 40 along the radial direction R, in other embodiments, the CCA system 100 may be configured to deliver CCA airflow to the turbine section at a location inward of the combustion section 40 along the radial direction R. Additionally, although the CCA system 100 is depicted providing a cooling airflow to the first stage 118 of turbine blades, in other embodiments, the CCA airflow may be used to cool any other suitable components, such as any other turbomachine rotor component (e.g., a high pressure compressor component, a low pressure turbine component), an exhaust system, a structural component (such as a frame or such as a case, as is done with certain clearance control systems), or an oil cooling system.

Referring still to FIG. 3, the exemplary gas turbine engine 10 further includes a cooling fluid supply 122 for providing a flow of cooling fluid to the CCA heat exchanger 104. Specifically, for the embodiment shown, the cooling fluid supply 122 includes a cooling fluid source 124, a cooling fluid duct 126, and a cooling fluid valve 128. The cooling fluid source 124 may provide a flow of cooling fluid to the CCA heat exchanger 104 through the cooling fluid duct 126. Within the CCA heat exchanger 104, the cooling fluid may accept heat from the CCA airflow, reducing a temperature of the CCA airflow. The cooling fluid valve 128 may control a volume of the flow of cooling fluid from the cooling fluid source 124 to the CCA heat exchanger 104 through the cooling fluid duct 126. In such a manner, the cooling fluid valve 128 may control a cooling capacity of the CCA system 100, and more specifically may control the amount of cooling available to the CCA system 100. The cooling fluid valve 128 may also be operably connected to the controller 94 described above with reference to FIG. 1.

In particular, as will be appreciated from the description herein, the gas turbine engine 10 may be configured to receive data indicative of an ambient condition of the gas turbine engine 10, data indicative of a deterioration parameter of the gas turbine engine 10, data indicative of an operating condition of the gas turbine engine 10, or a combination thereof. In response, the gas turbine engine 10 may be configured to modify the cooling capacity of the CCA system 100 in response to this received data. In certain exemplary embodiments, the engine 10 may modify the amount of cooling available to the CCA system 100 by opening or closing the cooling fluid valve 128 with the controller 94 and/or may actuate the valve 116 to vary a cooling capacity of the CCA airflow.

In such a manner, the gas turbine engine 10 may conserve energy by only providing the amount of cooling necessary for the CCA system 100 based on this received data, resulting in a more efficient gas turbine engine 10.

For example, in response to receiving data indicative of the ambient conditions being one or more of a hot day or high-altitude, the gas turbine engine 10 may increase the amount of cooling available to the CCA system 100 to allow the CCA system 100 to adequately cool the turbine section, and in particular to maintain a temperature of one or more components of the turbine section within their respective maximum operating temperature ranges.

Additionally, or alternatively, in response to receiving data indicative of the deterioration parameter of the gas turbine engine 10 indicating the gas turbine engine 10 has deteriorated past an as-designed condition, the gas turbine engine 10 may increase the amount of cooling available to the CCA system 100 to allow the CCA system 100 to adequately cool the turbine section. The increase in the amount of cooling available to the CCA system 100 may be proportional to the level of deterioration indicated by the deterioration parameter. In particular, it will be appreciated that as a gas turbine engine 10 deteriorates, the CCA airflow provided from the compressor section may start off at a higher temperature (as compared to an engine operating as-designed), as a result of a reduced efficiency within, e.g., the compressor section of the gas turbine engine 10. Accordingly, in order to provide a desired amount of cooling to the one or more components of the turbine section (e.g., the first stage of turbine rotor blades of the high-pressure turbine), it will be necessary to provide additional cooling to the CCA heat exchanger 104.

Moreover, in response to receiving data indicative of the operating condition of the gas turbine engine 10, the gas turbine engine 10 may increase or decrease the amount of cooling available to the CCA system 100. For example, in response to receiving data indicative of the operating condition being a low-power operating mode, the gas turbine engine 10 may reduce the amount of cooling available to the CCA system 100. By contrast, in response receiving data indicative of the operating condition being a high-power operating mode, the gas turbine engine 10 may increase the amount of cooling available to the CCA system 100.

Further, still, the gas turbine engine 10 may receive data indicative of a failure condition of the gas turbine engine 10, such as one or more of a broken pipe or duct, a failed or deteriorated seal, a cracked blade, an overflowing circuit, etc. In response, the gas turbine engine 10 may again modify the amount of cooling available to the CCA system 100 in response to this data to allow the CCA system 100 to effectively cool the turbine section. For example, the gas turbine engine 10 may increase the amount of cooling available to the CCA system 100 in response to this receive data.

In each of the above examples, the gas turbine engine 10 may increase the cooling capacity of the CCA airflow by actuating valve 116 in addition to, or in the alternative to increasing a cooling available to the CCA system 100, and/or may decrease the cooling capacity of the CCA airflow by actuating valve 116 in addition to, or in the alternative to decrease a cooling available to the CCA system 100. Additional exemplary aspects of these control steps of the present disclosure will be described in more detail below with reference to FIG. 8.

In at least certain exemplary aspects, the flow of cooling fluid may be a flow of bypass air (e.g., a flow of air from a bypass air flow path, such as bypass passage 82), a fuel flow (e.g., a flow of fuel from the fuel system of the gas turbine engine 10), a flow of thermal fluid from a thermal bus, flow of ambient air, flow bleed airflow (e.g., a flow of air from or through duct 84), or combination thereof. In general, utilizing more of such a flow of cooling fluid to increase a cooling available to the CCA system 100 in response to one or more of the data described above may result in a less efficient gas turbine engine 10.

Figure 4:
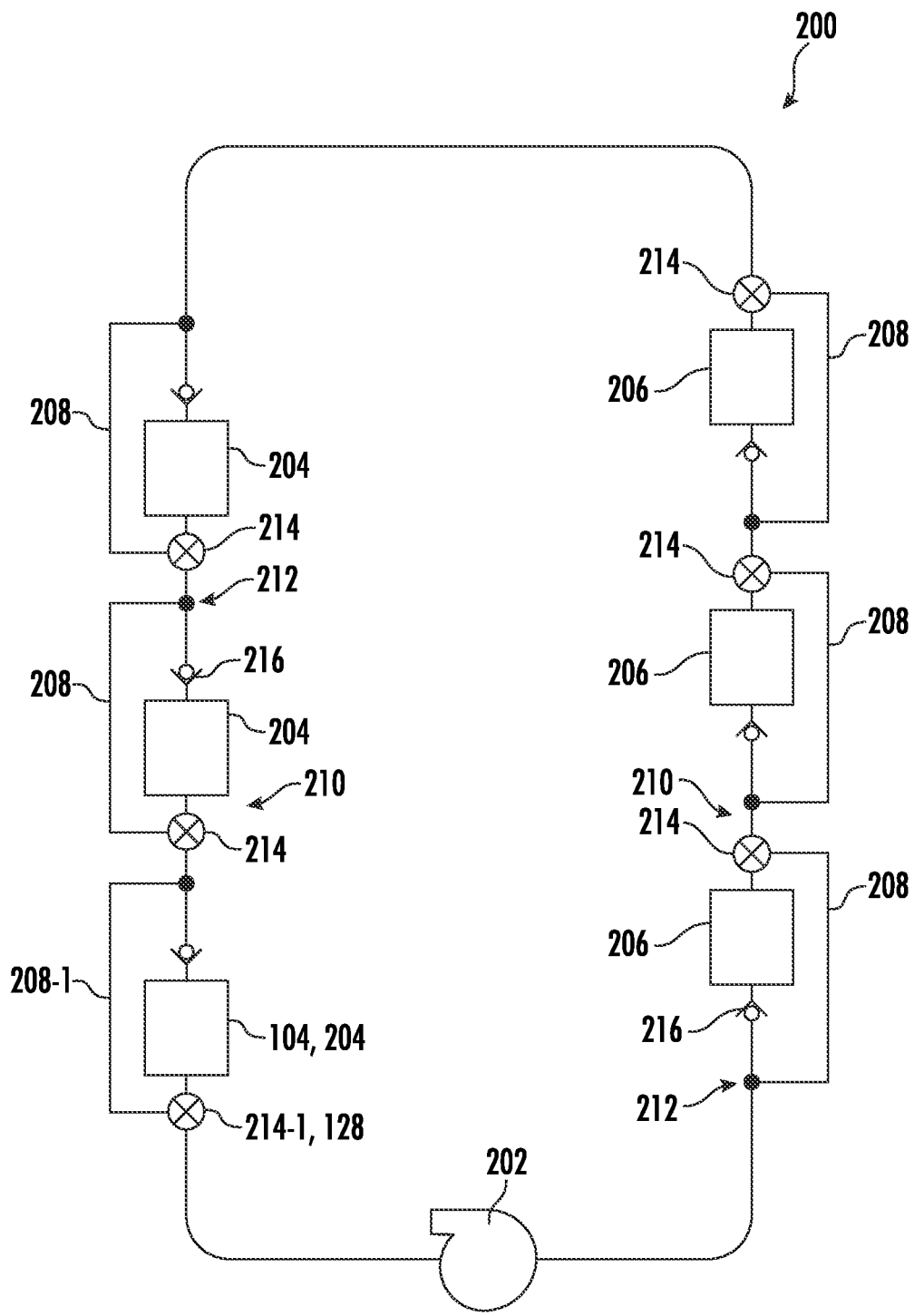
FIG. 4 is a schematic view of a thermal bus having a CCA heat exchanger integrated therein in accordance with an exemplary aspect of the present disclosure.

For example, in at least certain exemplary embodiments, the CCA system 100 may be integrated with a thermal bus, also referred to as a thermal transport bus 200. Referring now to FIG. 4, a thermal transport bus 200 in accordance with an exemplary aspect of the present disclosure, having a CCA system 100 integrated therein, is provided.

The thermal transport bus 200 includes an intermediary heat exchange fluid flowing therethrough and may be formed of one or more suitable fluid conduits. The heat exchange fluid may be an incompressible fluid having a high temperature operating range. Additionally, alternatively, heat exchange fluid may be a single phase fluid, or alternatively, may be a phase change fluid. In certain exemplary embodiments, the heat exchange fluid may be a supercritical fluid, such as a supercritical CO2.

A pump 202 is provided in fluid communication with the heat exchange fluid in the thermal transport bus 200 for generating a flow of the heat exchange fluid in/through the thermal transport bus 200. As viewed in FIG. 2, the pump 202 may generate a flow of the heat exchange fluid generally in a clockwise direction through the thermal transport bus 200.

Moreover, the exemplary thermal management system 100 includes a one or more heat source exchangers 204 in thermal communication with the heat exchange fluid in the thermal transport bus 200. Specifically, the thermal management system 100 depicted includes a plurality of heat source exchangers 204. The plurality of heat source exchangers 204 are configured to transfer heat from one or more of the accessory systems of the turbofan engine 10 (or in operable communication with the engine 10) to the heat exchange fluid in the thermal transport bus 200. For example, in certain exemplary embodiments, the plurality of heat source exchangers 204 may include one or more of: a main lubrication system heat exchanger for transferring heat from a main lubrication system; an ACC system heat source exchanger for transferring heat from an ACC system; a generator lubrication system heat source exchanger for transferring heat from the generator lubrication system; an ECS heat exchanger for transferring heat from the ECS; an electronics cooling system heat exchanger for transferring heat from the electronics cooling system; a vapor compression system heat exchanger; an air cycle system heat exchanger; and an auxiliary system(s) heat source exchanger.

For the embodiment depicted, the CCA system 100 is integrated into the thermal bus 200, with the CCA heat exchanger 104 configured as a heat source exchanger 204.

Further for the embodiment depicted, there are three heat source exchangers 204 (including the CCA heat exchanger 104). The heat source exchangers 204 each arranged in series flow along the thermal transport bus 200. However, in other exemplary embodiments, any other suitable number of heat source exchangers 204 may be included and one or more of the heat source exchangers 204 may be arranged in parallel flow along the thermal transport bus 200 (in addition to, or in the alternative to the serial flow arrangement depicted). For example, in other embodiments, there may be a single heat source exchanger 204 in thermal communication with the heat exchange fluid in the thermal transport bus, or alternatively, there may be at least two heat source exchangers 204, least four heat source exchangers 204, at least five heat source exchangers 204, or at least six heat source exchangers 204 in thermal communication with heat exchange fluid in the thermal transport bus 200.

Additionally, the exemplary thermal management system 100 of FIG. 4 further includes one or more heat sink exchanger 206 permanently or selectively in thermal communication with the heat exchange fluid in the thermal transport bus 200. The one or more heat sink exchangers 206 are located downstream of the plurality of heat source exchangers 204 and are configured for transferring heat from the heat exchange fluid in the thermal transport bus 200, e.g., to atmosphere, to fuel, to a fan stream, etc. For example, in certain embodiments the one or more heat sink exchangers 206 may include at least one of a RAM heat exchanger, a fuel heat exchanger, a fan stream heat exchanger, a bleed air heat exchanger, an engine intercooler, or a cold air output of an air cycle system. The RAM heat exchanger may be configured as an "air to heat exchange fluid" heat exchanger integrated into one or both of the gas turbine engine 10 or an aircraft including the turbofan engine 10. During operation, the RAM heat exchanger may remove heat from any heat exchange fluid therein by flowing a certain amount of RAM air over the RAM heat exchanger. Additionally, the fuel heat exchanger is a "fluid to heat exchange fluid" heat exchanger wherein heat from the heat exchange fluid is transferred to a stream of liquid fuel for the gas turbine engine 10. Moreover, the fan stream heat exchanger is generally an "air to heat exchange fluid" heat exchanger which flows, e.g., bypass air over heat exchange fluid to remove heat from the heat exchange fluid. Further, the bleed air heat exchanger is generally an "air to heat exchange fluid" heat exchanger which flows, e.g., bleed air from the LP compressor over heat exchange fluid to remove heat from the heat exchange fluid.

For the embodiment of FIG. 4, the one or more heat sink exchangers 206 of the thermal management system 100 depicted includes a plurality of individual heat sink exchangers 206. More particularly, for the embodiment of FIG. 4, the one or more heat sink exchangers 206 include three heat sink exchangers 206 arranged in series. The three heat sink exchangers 206 are configured as a RAM heat exchanger, a fuel heat exchanger, and a fan stream heat exchanger. However, in other exemplary embodiments, the one or more heat sink exchangers 206 may include any other suitable number of heat sink exchangers 206. For example, in other exemplary embodiments, a single heat sink exchanger 206 may be provided, at least two heat sink exchangers 206 may be provided, at least four heat sink exchangers 206 may be provided, or at least five heat sink exchangers 206 may be provided. Additionally, in still other exemplary embodiments, two or more of the one or more heat sink exchangers 206 may alternatively be arranged in parallel flow with one another.

Referring still to the exemplary embodiment depicted in FIG. 4, one or more of the plurality of heat sink exchangers 206 and one or more of the plurality of heat source exchangers 204 are selectively in thermal communication with the heat exchange fluid in the thermal transport bus 200. More particularly, the thermal management system 100 depicted includes a plurality of bypass lines 208 for selectively bypassing each heat source exchanger 204 and each heat sink exchanger 206 in the plurality of heat sink exchangers 206. Each bypass line 208 extends between an upstream juncture 210 and a downstream juncture 212—the upstream juncture 210 located just upstream of a respective heat source exchanger 204 or heat sink exchanger 206, and the downstream juncture 212 located just downstream of the respective heat source exchanger 204 or heat sink exchanger 206.

Additionally, each bypass line 208 meets at the respective upstream juncture 210 with the thermal transport bus 200 via a three-way valve 214. The three-way valves 214 each include an inlet fluidly connected with the thermal transport bus 200, a first outlet fluidly connected with the thermal transport bus 200, and a second outlet fluidly connected with the bypass line 208. The three-way valves 214 may each be a variable throughput three-way valve, such that the three-way valves 214 may vary a throughput from the inlet to the first and/or second outlets. For example, the three-way valves 214 may be configured for providing anywhere between zero percent (0%) and one hundred percent (100%) of the heat exchange fluid from the inlet to the first outlet, and similarly, the three-way valves 214 may be configured for providing anywhere between zero percent (0%) and one hundred percent (100%) of the heat exchange fluid from the inlet to the second outlet.

Notably, the three-way valves 214 may be in operable communication with a controller of the gas turbine engine 10 and/or of an aircraft including the turbofan engine 10 (e.g., controller 94).

Further, each bypass line 208 also meets at the respective downstream juncture 212 with the thermal transport bus 200. Between each heat source exchanger 204 or heat sink exchanger 206 and downstream juncture 212, the thermal transport bus 200 includes a check valve 216 for ensuring a proper flow direction of the heat exchange fluid. More particularly, the check valve 216 prevents a flow of heat exchange fluid from the downstream juncture 212 towards the respective heat source exchanger 204 or heat sink exchanger 206.

Notably, for the embodiment shown, as mentioned above, the CCA system 100 is integrated into the thermal management system depicted in FIG. 4. In particular, for the embodiment shown, the CCA heat exchanger 104 is configured as the heat source exchanger 204-1. Such a configuration, the valve 128 for modifying the amount of cooling available to the CCA heat exchanger 104 in response to, e.g., received data, is the three-way valve 214-1. Further, such a configuration, the cooling fluid supply 122 includes the upstream portions of the thermal bus 200, including the heat sink exchangers 206.

It will be appreciated, however, that in other exemplary embodiments, the CCA heat exchanger 104 may be configured to receive cooling fluid 302 in any other suitable manner. For example, referring now to FIG. 5, a schematic view of a CCA heat exchanger 104 and cooling fluid supply 122 in accordance with another exemplary embodiment of the present disclosure is provided. The CCA heat exchanger 104 and cooling fluid supply 122 may be incorporated into the engine 10 of FIG. 1 or 2, or any other suitable engine 10.

For the embodiment shown, the cooling fluid supply 122 is an airflow duct 300 having a flow of cooling fluid 302 flowing therethrough. The CCA heat exchanger 104 is positioned within the airflow duct 300 and in thermal communication with the flow of cooling fluid 302 flowing through the airflow duct 300.

Figure 5:
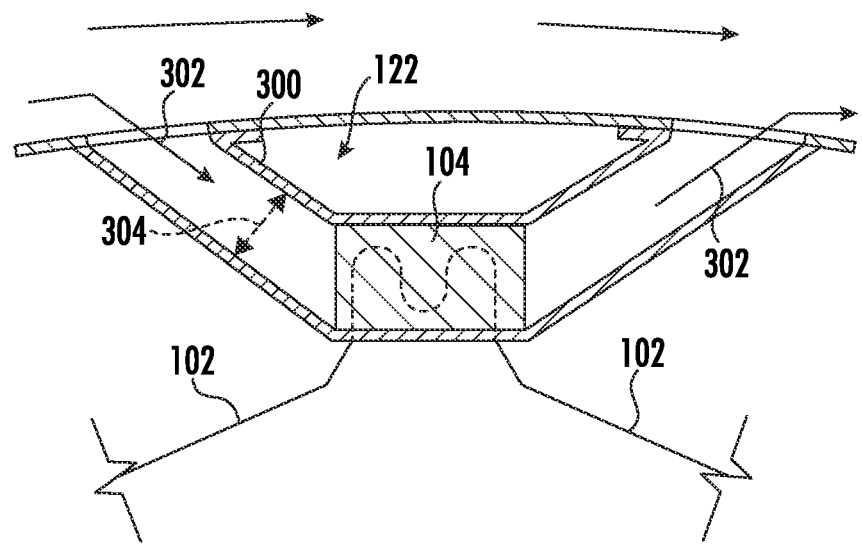
FIG. 5 is a schematic view of a first cooling fluid supply and a first CCA heat exchanger in accordance with an exemplary aspect of the present disclosure.

In the embodiment depicted in FIG. 5, the amount of cooling available for the CCA heat exchanger 104 may be relatively fixed based on the structure of the cooling fluid supply 122, a size of the CCA heat exchanger 104, or both. For example, the airflow duct 300 depicted in FIG. 5 defines a fixed cross-sectional area, indicated by the cross-sectional measure 304. In such a manner, the airflow duct 300 may only allow a certain amount of cooling fluid 302 to reach the CCA heat exchanger 104.

As described above, over the life of an engine, more cooling may be needed for the CCA system 100 to ensure that it is able to provide a desired amount of cooling for the turbine section of the engine. In at least certain prior gas turbine engines, the CCA systems 100 may have been designed to provide a necessary amount of cooling for the turbine section not only when the engine is brand-new, operating at "as-designed" specifications, but also for when the engine is towards the end of its life span, and operating under harsh ambient conditions (e.g. hot day, high-altitude).

By contrast, for at least certain of the exemplary embodiments depicted, the CCA system 100 and cooling fluid supply 122 are designed to provide the desired amount of cooling for the CCA system 100 during a first portion of the engine's 10 lifespan, such that the CCA system 100 and cooling fluid supply 122 may provide a desired amount of cooling for the turbine section up until a certain threshold deterioration of the engine 10. For example, in the embodiment depicted in FIG. 5, it will be appreciated that the compressor section of the gas turbine engine 10 incorporating the CCA system 100 and cooling fluid 302 supplied depicted defines an "as-designed" compressor temperature during a first steady-state operating condition, an actual compressor temperature during the first steady-state operating condition, and an expected end of life compressor temperature during the first steady-state operating condition. Further, the turbine section of the gas turbine engine 10 may define a maximum turbine temperature limit.

The first steady-state operating condition may be a takeoff operating condition or a climb operating condition. The as-designed compressor temperature may be an as-designed compressor exit temperature during the takeoff operating condition or the climb operating condition, and the actual compressor temperature may be the actual compressor exit temperature during the takeoff operating condition or climb operating condition. The maximum turbine temperature limit may be a temperature limit for the first stage of turbine rotor blades of the high pressure turbine 36.

It will be appreciated that the term "as-designed" refers to the value for a particular parameter for the engine in a new condition, e.g., having less than 100 hours of operation, during a standard day operating condition. Similarly, it will be appreciated that the term "end of life" with respect to the expected end of life compressor temperature refers to an expected compressor temperature of the gas turbine engine at the operating condition when the engine is in a state requiring the engine to be taken off wing and overhauled (e.g., requiring repair or replacement of one or more blades or vanes, repair or replacement of one or more seals within a turbomachinery flowpath of the engine, or the like). The engine state requiring the engine to be taken off wing and overhauled may be a state in which an exhaust gas temperature meets or exceeds an exhaust gas temperature limit during high power operations of the engine (e.g., takeoff or climb).

For the embodiment shown, the cooling fluid supply 122 is configured to provide the CCA heat exchanger 104 with a flow of cooling fluid 302 to maintain a temperature of one or more components of the turbine section within the maximum turbine temperature limit during the takeoff operating condition or the climb operating condition for so long as the actual compressor temperature during this operating condition is at most 1.15 times the as-designed compressor temperature, such as at most 1.1 times the as-designed compressor temperature, such as at most 1.08 times the as-designed compressor temperature, such as at most 1.06 times the as-designed compressor temperature, and at least until the actual compressor temperature during this operating condition is 1.03 times the as-designed compressor temperature. For example, it will be appreciated that the engine defines a lifetime temperature rise between the expected end of life compressor temperature and the as designed compressor temperature at the operating condition, as well an actual temperature rise between the actual compressor temperature and the as designed compressor temperature at the operating condition. For the embodiment shown, the cooling fluid supply 122 is configured to provide the CCA heat exchanger 104 with a flow of cooling fluid 302 to maintain a temperature of one or more components of the turbine section within the maximum turbine temperature limit during the takeoff operating condition or the climb operating condition for so long as the actual temperature rise during this operating condition is at most seventy percent (70%) of the lifetime temperature rise, such as at most sixty percent (60%), and at least until the actual temperature rise during this operating condition is at thirty percent (30%) of the lifetime temperature rise.

This limitation applies to operation of the engine during normal ambient conditions, as well as during harsh ambient conditions (e.g., hot day, high-altitude). It will be appreciated that such a configuration may allow for the CCA heat exchanger 104 and cooling fluid supply 122 to adequately cool the turbine section of the gas turbine engine 10 for a first portion 112 of the lifespan of the engine (e.g., for at least about 10% of the lifespan the engine, such as at least about 25% of the lifespan of the engine, such as at least about 50% of the lifespan of the engine), but not for a later portion or tail end of the lifespan on the engine.

Notably, although the example above is described in association with a CCA system 100 for providing CCA airflow to a turbine section of the engine, in other embodiments, the CCA system 100 may additionally or alternatively be configured to provide a CCA airflow to any other suitable engine component, such that the maximum turbine temperature limit may instead be a maximum component temperature limit (e.g., a maximum temperature limit for any other turbomachine rotor component (e.g., a high pressure compressor component, a low pressure turbine component), an exhaust system, a structural component (such as a frame or such as a case, as is done with certain clearance control systems), or an oil cooling system).

It will be appreciated that the CCA system 100 may need to increase rather substantially through an operating life of the gas turbine engine 10. For example, in one example configuration, the CCA system 100 may need to have a thermal capacity to provide for a 175 degree Fahrenheit temperature reduction for a first mass flow of CCA air at a first operating condition in an as designed state, and may further need to have a thermal capacity to provide for an 850 degree Fahrenheit temperature reduction for a second mass flow of CCA air at the first operating condition in an end of life state. The second mass flow of CCA air may be at least 5% greater than the first mass flow of CCA air, such as at least 10% greater than the first mass flow of CCA air. Such an increase in thermal capacity needed by the CCA system 100 may further be exacerbated by ambient conditions.

Once it is determined that the engine has deteriorated to the extent that the CCA heat exchanger 104 and cooling fluid supply 122 depicted in FIG. 5 may not be sufficient to adequately cool the turbine section of the gas turbine engine 10 through all anticipated ambient conditions, the CCA heat exchanger 104, the cooling fluid supply 122, or both may be modified, switched out, and/or supplemented such that the CCA heat exchanger 104 and the cooling fluid supply 122 may provide additional cooling capacity to adequately cool the turbine section the gas turbine engine 10 through all anticipated ambient conditions. Such may occur during an overhaul of the engine 10, during a maintenance operation of the engine 10, etc.

Figure 6:
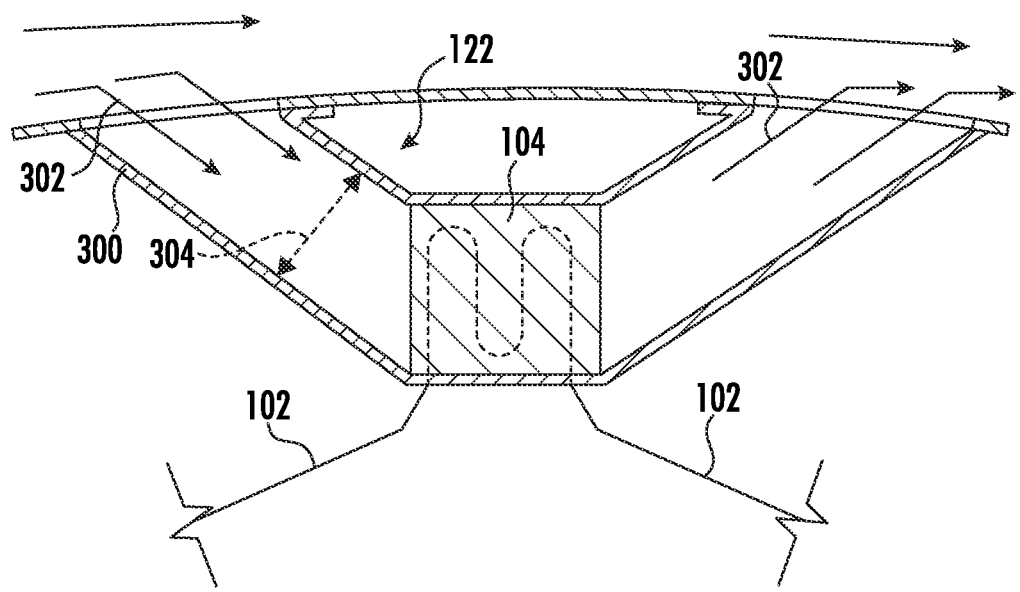
FIG. 6 is a schematic view of a second cooling fluid supply and a second CCA heat exchanger in accordance with an exemplary aspect of the present disclosure.

For example, referring now to FIG. 6, in at least certain embodiments, the cooling duct 300 of the cooling fluid supply 122 may be switched out with a larger cooling duct 300, defining a larger cross-sectional area to allow more airflow through the cooling duct 300. Additionally, or alternatively, the CCA heat exchanger 104 may be switched out with a larger CCA heat exchanger 104 to provide increased cooling of the CCA airflow.

For example, in certain exemplary embodiments, a cross-sectional area of the cooling duct 300 may be increased by at least about 10%, such as by at least 20%, such as by at least 30%, such as by at least 40%, such as by up to 200%. Similarly, in at least certain embodiments, a maximum capacity of the CCA heat exchanger 104 may be increased by at least about 10%, such as by at least 20%, such as by at least 30%, such as by at least 40%, such as by up to 200%. For the purposes of this discussion, the maximum capacity of the CCA heat exchanger 104 is measured in British thermal units per hour (Btu/hr).

Figure 7:
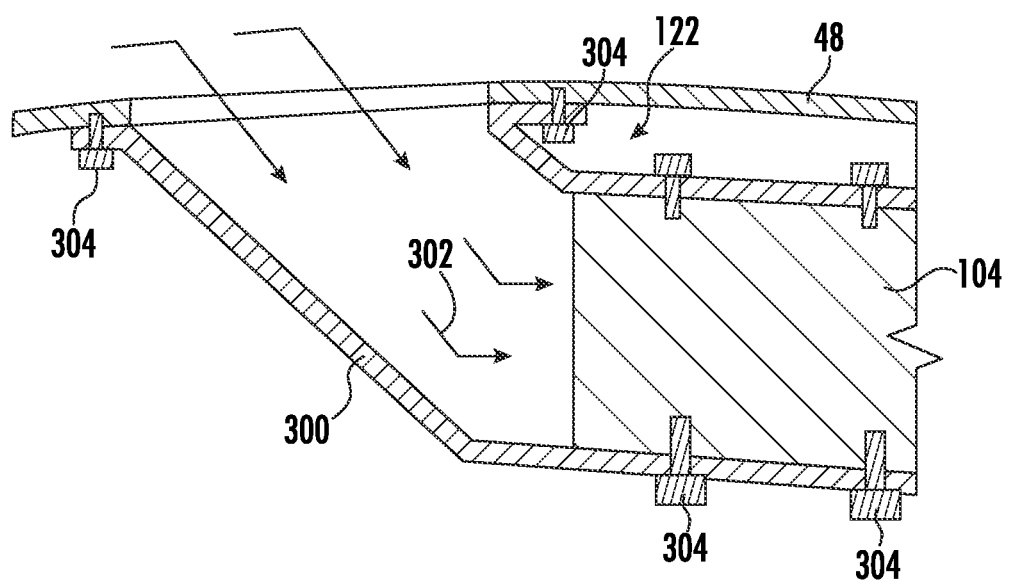
FIG. 7 is a schematic view of a cooling fluid supply and a CCA heat exchanger removably coupled within a gas turbine engine in accordance with an exemplary aspect of the present disclosure.

Referring now to FIG. 7, a cross-sectional view of a CCA heat exchanger 104 and cooling fluid supply 122 in accordance with an exemplary embodiment of the present disclosure is provided. It will be appreciated that in order to switch out the hardware of a CCA heat exchanger 104, a cooling fluid supply 122, or both, it may be necessary to have these components removably coupled within the gas turbine engine 10. Specifically, for the embodiment shown, the cooling duct 300 of the cooling fluid supply 122 is removably coupled within the gas turbine engine 10. More specifically, for the embodiment shown, the cooling duct 300 of the cooling fluid supply 122 is removably coupled within the gas turbine engine 10 using a plurality of fasteners 304. For the embodiment shown, the plurality fasteners 304 couple the cooling duct to a cowl 48 of the engine 10, however, in other embodiments, the cooling duct 302 of the cooling fluid supply 122 may be removably coupled any other suitable location.

Similarly, for the embodiment shown, the CCA heat exchanger 104 is removably coupled within the gas turbine engine 10. More specifically, for the embodiment shown, the CCA heat exchanger 104 is removably coupled to the cooling duct 300 of the cooling fluid supply 122 also using a plurality of fasteners 304. It will be appreciated, however, that in other embodiments, the CCA heat exchanger 104 may alternatively be removably coupled it any other suitable location within the gas turbine engine 10.

Moreover, it will be appreciated that in other exemplary embodiments other hardware modification may additionally or alternatively be made to increase a cooling capacity of the CCA system 100. For example, in certain exemplary embodiments, the hardware modification may include adding an airflow diverter to increase an airflow through the duct 300, an airflow cooler to cooler the airflow through the duct 300, etc. Additionally, or alternatively, still, when the CCA heat exchanger 104 is integrated into a thermal bus (such as the thermal bus 200 of FIG. 4), the hardware modification may include switching out one or more of the heat source exchanger or heat sink exchangers, removing one or more of the heat source exchanger, adding a heat sink exchanger, etc. For example, a heat sink heat exchanger may be added along with an air cycle machine, a cooling capacity of the thermal bus (and the CCA heat exchanger 104) may be increased by adding a vapor compressor system, etc.

Figure 8:
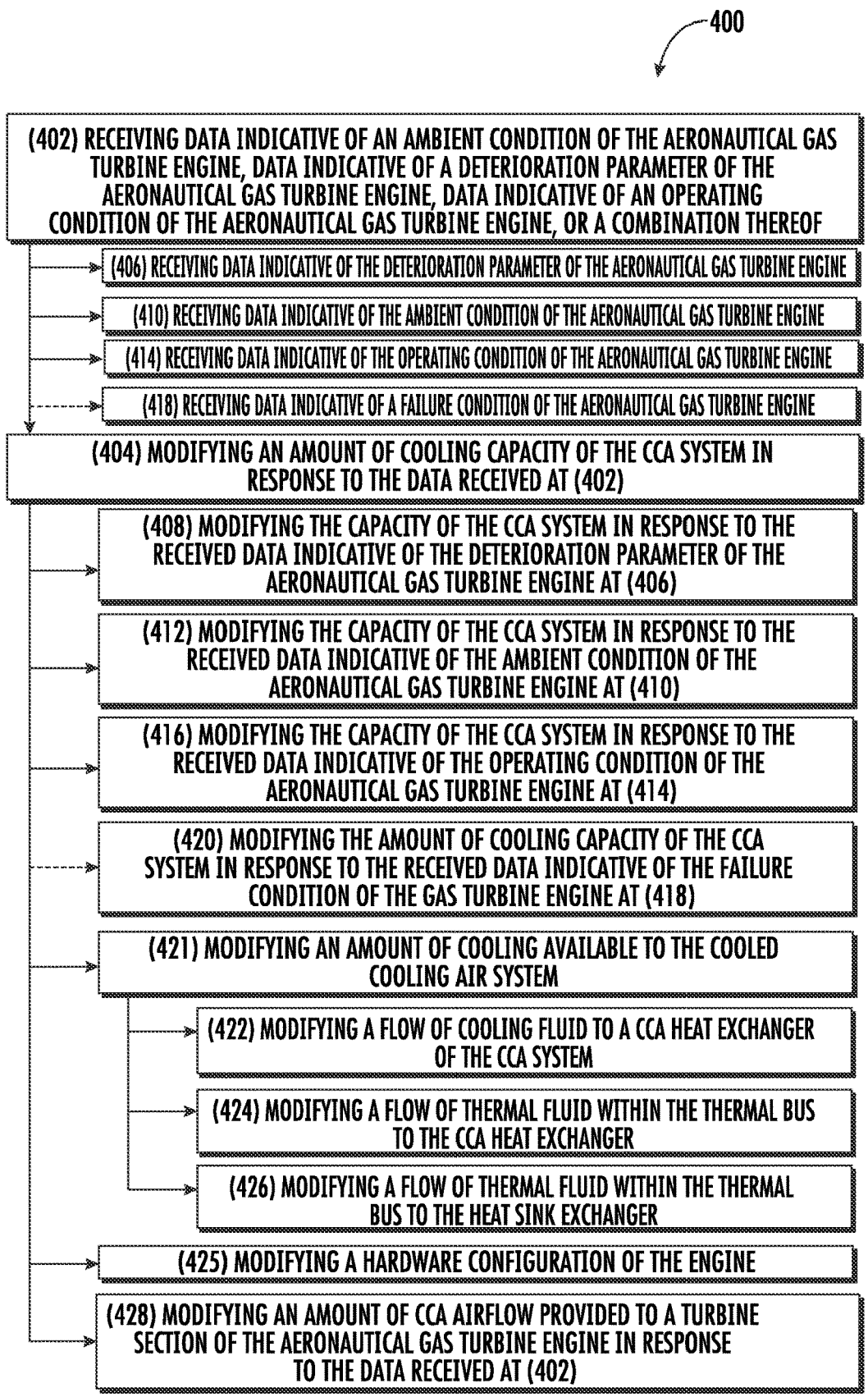
FIG. 8 is a flow diagram of a method for operating a CCA system in accordance with an exemplary aspect of the present disclosure.

Referring now to FIG. 8, a flow diagram of a method 400 for controlling a CCA system for an aeronautical gas turbine engine is provided. The exemplary method 400 may be utilized with one or more the exemplary embodiments described above with reference to FIGS. 1 through 6. However, in other embodiments, the method 400 may be utilized with any other suitable gas turbine engine.

Method 400 includes at (402) receiving data indicative of an ambient condition of the aeronautical gas turbine engine, data indicative of a deterioration parameter of the aeronautical gas turbine engine, data indicative of an operating condition of the aeronautical gas turbine engine, or a combination thereof; and at (404) modifying an amount of cooling capacity of the CCA system in response to the data received at (402).

More specifically, for the exemplary aspect depicted, receiving data at (402) includes at (406) receiving data indicative of the deterioration parameter of the aeronautical gas turbine engine, and modifying the amount of cooling capacity of the CCA system at (404) includes at (408) modifying the amount of capacity of the CCA system in response to the received data indicative of the deterioration parameter of the aeronautical gas turbine engine at (406). The data indicative of the deterioration parameter may include data indicative of the turbine blade inlet temperature, an exhaust gas temperature, or both. Additionally, alternatively, the deterioration parameter may be an engine age-based parameter (e.g., hours accumulated, etc.), any turbine temperature parameter, or a calculated parameter based on one or more of these temperatures and/or any other suitable parameter for tracking deterioration of the gas turbine engine.

The deterioration parameter generally characterizes the level of deterioration of the engine. Deterioration generally occurs through wearing out of seals, damage to components, etc. which results in the engine running less efficiently. As the engine deteriorates, compressor exit temperatures may increase for the same amount of engine output, and similarly T3 and T41 may also increase for the same amount of engine output. Accordingly, an older engine, as compared to an engine running as-designed, will need more cooling available to the CCA system to allow the CCA system to maintain a temperature of the turbine section below a maximum turbine temperature limit (e.g., to maintain a temperature of the first stage of turbine rotor blades below a temperature limit for the first stage of turbine rotor blades).

Further for the exemplary aspect depicted, receiving data at (402) includes at (410) receiving data indicative of the ambient condition of the aeronautical gas turbine engine, and modifying the amount of cooling capacity of the CCA system at (404) includes at (412) modifying the amount of cooling capacity of the CCA system in response to the received data indicative of the ambient condition of the aeronautical gas turbine engine at (410). The data indicative the ambient condition may include ambient temperature, ambient altitude, or both.

Further, still, for the exemplary aspect depicted, receiving data at (402) includes at (414) receiving data indicative of the operating condition of the aeronautical gas turbine engine, and modifying the amount of cooling capacity of the CCA system at (404) includes at (416) modifying the amount of cooling capacity of the CCA system in response to the received data indicative of the operating condition of the aeronautical gas turbine engine at (414). The operating condition may be an operating mode of the gas turbine engine, such as a takeoff operating mode, a climb operating mode, a cruise operating mode, etc.

Moreover, for the exemplary aspect depicted, receiving data at (402) may further include at (418) receiving data indicative of a failure condition of the aeronautical gas turbine engine. With such an exemplary aspect, modifying the amount of cooling capacity of the CCA system at (404) may further include at (420) modifying the amount of cooling capacity of the CCA system in response to the received data indicative of the failure condition of the gas turbine engine at (418).

In certain exemplary aspects, modifying the amount of cooling capacity of the CCA system at (404) includes at (421) modifying an amount of cooling available to the cooled cooling air system. In such a configuration, the method 400 may adjust the capability of the CCA system to provide cooling to a CCA airflow.

For example, in the exemplary aspect depicted, modifying the amount of cooling available to the cooled cooling air system at (421) includes at (422) modifying a flow of cooling fluid to a CCA heat exchanger of the CCA system. The flow of cooling fluid may be a flow of bypass air, fuel flow, a flow of thermal fluid from a thermal boss, a flow of ambient air, a flow bleed air flow, or combination thereof.

For example, modifying a flow of cooling fluid to a CCA heat exchanger of the CCA system at (422) may include: actuating a valve in flow communication with a duct or conduit for providing the flow of cooling fluid to the CCA heat exchanger; actuating a variable geometry component in fluid communication with a duct for providing the flow of cooling fluid to the CCA heat exchanger (e.g., actuating a flap, a door, a scoop or the like configured to increase or decrease a fluid flow through the duct); modulating some other flow modification device in flow communication with a duct or conduit for providing the flow of cooling fluid to the CCA heat exchanger; etc.

Additionally, or alternatively, the CCA heat exchanger may be integrated into a thermal bus. The thermal bus may include a heat sink exchanger. With such an exemplary embodiment, modifying the amount of cooling available at (404) may further include at (424) modifying a flow of thermal fluid within the thermal bus to the CCA heat exchanger, and/or may further include at (426) modifying a flow of thermal fluid within the thermal bus to the heat sink exchanger. The heat sink exchanger may be a fuel heat sink exchanger, an air-cooled heat sink exchanger, or both. In such a manner, the method 400 may directly or indirectly modify the amount of cooling available to the CCA system.

Additionally, or alternatively, still, in certain exemplary aspects, modifying the amount of cooling available at (404) may further include at (425) modifying a hardware configuration of the engine. For example, the method 400 at (425) may switching out one or more pieces of hardware on the engine to vary a cooling capacity of the CCA system, such as installing a different cooling fluid supply having increased capacity for providing cooling fluid, installing a different CCA heat exchanger or additional CCA heat exchangers to increase a cooling capacity of the CCA system, varying a configuration of a thermal bus providing cooling to the CCA heat exchanger (e.g., add a cooling heat exchanger, remove a heat source heat exchanger, switching out an existing heat exchanger for a different heat exchanger with a different capacity, etc.), or a combination thereof.

Moreover, in addition to, or in the alternative to, modifying the amount of cooling available to the cooled cooling air system at (421), modifying the amount of cooling capacity of the CCA system at (404) may further include at (428) modifying a thermal capacity of a CCA airflow provided to a turbine section of the aeronautical gas turbine engine in response to the data received at (402). Modifying the thermal capacity at (428) may include modifying a temperature of the airflow, modifying a volume of the airflow, or both.

It will be appreciated that although the method 400 is described as providing CCA airflow to the turbine section of the engine (such as an HP turbine), in other exemplary aspects, the method 400 may additionally or alternatively provide CCA airflow to any other suitable location of the engine (e.g., an HP compressor, an LP turbine, any other rotary component, structure, case, etc.).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A method of controlling a cooled cooling air system for an aeronautical gas turbine engine, the method comprising: receiving data indicative of an ambient condition of the aeronautical gas turbine engine, data indicative of a deterioration parameter of the aeronautical gas turbine engine, data indicative of an operating condition of the aeronautical gas turbine engine, or a combination thereof; and modifying a cooling capacity of the cooled cooling air system in response to the received data indicative of the ambient condition of the aeronautical gas turbine engine, data indicative of the deterioration parameter of the aeronautical gas turbine engine, data indicative of an operating condition of the aeronautical gas turbine engine, or the combination thereof.

The method of one or more of these clauses, wherein modifying the cooling capacity of the cooled cooling air system comprises modifying an amount of cooling available to the cooled cooling air system.

The method of one or more of these clauses, wherein the step of receiving comprises receiving data indicative of the deterioration parameter of the aeronautical gas turbine engine, and wherein the step of modifying comprises modifying the amount of cooling capacity of the cooled cooling air system in response to the received data indicative of the deterioration parameter of the aeronautical gas turbine engine.

The method of one or more of these clauses, wherein the data indicative of the deterioration parameter comprises data indicative of a turbine blade inlet temperature, an exhaust gas temperature, or both.

The method of one or more of these clauses, wherein the step of receiving comprises receiving data indicative of the ambient condition of the aeronautical gas turbine engine, and wherein the step of modifying comprises modifying the amount of cooling capacity of the cooled cooling air system in response to the received data indicative of the ambient condition of the aeronautical gas turbine engine.

The method of one or more of these clauses, wherein the data indicative of the ambient condition comprises ambient temperature, ambient altitude, or both.

The method of one or more of these clauses, wherein the step of receiving comprises receiving data indicative of the operating condition of the aeronautical gas turbine engine, and wherein the step of modifying comprises modifying the amount of cooling capacity of the cooled cooling air system in response to the received data indicative of the operating condition of the aeronautical gas turbine engine.

The method of one or more of these clauses, further comprising receiving data indicative of a failure condition of the aeronautical gas turbine engine, and wherein the step of modifying further comprises modifying the amount of cooling capacity of the cooled cooling air system in response to the received data indicative of the failure condition of the aeronautical gas turbine engine.

The method of one or more of these clauses, wherein the step of modifying comprises modifying a flow of cooling fluid to a CCA heat exchanger of the cooled cooling air system.

The method of one or more of these clauses, wherein the flow of cooling fluid is a flow of bypass air, a fuel flow, a flow of thermal fluid from a thermal bus, a flow of ambient air, a flow bleed airflow, or a combination thereof.

The method of one or more of these clauses, wherein the cooled cooling air system comprises a CCA heat exchanger, wherein the CCA heat exchanger is integrated into a thermal bus, where the thermal bus further comprises a heat sink heat exchanger, and wherein the step of modifying further comprises modifying a flow of thermal fluid within the thermal bus to the heat sink heat exchanger, a temperature of the flow of thermal fluid within the thermal bus, or both.

The method of one or more of these clauses, wherein modifying the cooling capacity of the cooled cooling air system comprises modifying a hardware configuration of the engine to vary a cooling capacity of the cooled cooling air system.

The method of one or more of these clauses, wherein modifying the cooling capacity of the cooled cooling air system comprises modifying an amount of CCA airflow provided to a turbine section of the aeronautical gas turbine engine in response to the received data indicative of the ambient condition of the aeronautical gas turbine engine, data indicative of the deterioration parameter of the aeronautical gas turbine engine, data indicative of an operating condition of the aeronautical gas turbine engine, or the combination thereof.

An aeronautical gas turbine engine comprising: a compressor section, a combustor section, and a turbine section in serial flow order; a cooled cooling air system comprising a CCA heat exchanger in airflow communication with the compressor section and the turbine section, the cooled cooling air system configured for receiving airflow from the compressor section and providing CCA airflow to the turbine section; and a controller operably connected to the cooled cooling air system, the controller configured to receive data indicative of an ambient condition of the aeronautical gas turbine engine, data indicative of a deterioration parameter of the aeronautical gas turbine engine, data indicative of an operating condition of the aeronautical gas turbine engine, or a combination thereof; and modify an amount of cooling capacity of the CCA heat exchanger in response to the received data indicative of the ambient condition of the aeronautical gas turbine engine, data indicative of the deterioration parameter of the aeronautical gas turbine engine, data indicative of an operating condition of the aeronautical gas turbine engine, or the combination thereof.

An aeronautical gas turbine engine comprising: a compressor section, a combustor section, and a turbine section in serial flow order, the compressor section defining an as-designed compressor temperature during a first steady state operating condition and an actual compressor temperature during the first steady state operating condition, the gas turbine engine defining a maximum component temperature limit during the first steady state operating condition; a cooled cooling air system comprising a CCA heat exchanger in airflow communication with the compressor section and the turbine section, the cooled cooling air system configured for receiving airflow from the compressor section and providing CCA airflow to the turbine section; and a cooling fluid supply in fluid communication with the CCA heat exchanger, wherein the cooling fluid supply is configured to provide the CCA heat exchanger with a flow of cooling fluid to maintain a component temperature within the maximum component temperature limit during the first steady state operating condition when the actual compressor temperature during the first steady state operating condition is at most 1.15 times the as-designed compressor temperature.

The aeronautical gas turbine engine of one or more of these clauses, wherein the as designed compressor temperature is an as-designed compressor exit temperature during the first steady state operating condition and wherein the actual compressor temperature is the actual compressor exit temperature during the first steady state operating condition.

The aeronautical gas turbine engine of one or more of these clauses, wherein the first steady state operating condition is a takeoff operating condition or a climb operating condition.

The aeronautical gas turbine engine of one or more of these clauses, wherein the turbine section comprises a high pressure turbine having a first stage of turbine rotor blades, wherein the CCA heat exchanger is in airflow communication with the first stage of turbine rotor blades of the high pressure turbine, and wherein the maximum component temperature limit is a maximum allowable operating temperature of the first stage of turbine rotor blades.

The aeronautical gas turbine engine of one or more of these clauses, wherein the cooled cooling air system defines a maximum cooling capacity limited by a size of the cooling fluid supply, a size of the CCA heat exchanger, or both.

The aeronautical gas turbine engine of one or more of these clauses, wherein the cooling fluid supply is configured to provide the CCA heat exchanger with the flow of cooling fluid to maintain the turbine temperature within the maximum component temperature limit during the first steady state operating condition when the actual compressor temperature during the first steady state operating condition is at most 1.08 times the as-designed compressor temperature.

We claim:

1. A method of controlling a cooled cooling air system for an aeronautical gas turbine engine, the method comprising:
   receiving data indicative of an ambient condition of the aeronautical gas turbine engine, data indicative of a deterioration parameter of the aeronautical gas turbine engine, data indicative of an operating condition of the aeronautical gas turbine engine, or a combination thereof; and
   modifying a cooling capacity of the cooled cooling air system in response to the received data indicative of the ambient condition of the aeronautical gas turbine engine, data indicative of the deterioration parameter of the aeronautical gas turbine engine, data indicative of an operating condition of the aeronautical gas turbine engine, or the combination thereof;
   wherein modifying the cooling capacity of the cooled cooling air system comprises modifying a cooling capacity of a cooling fluid provided to a CCA heat exchanger of the cooled cooling air system; and
   wherein modifying the cooling capacity of the cooling fluid provided to the CCA heat exchanger of the cooled cooling air system comprises modifying an aspect other than temperature of a flow of the cooling fluid provided to the CCA heat exchanger of the cooled cooling air system.

2. The method of claim 1, wherein modifying the cooling capacity of the cooled cooling air system comprises modifying an amount of cooling available to the cooled cooling air system.

3. The method of claim 1, wherein the step of receiving comprises receiving data indicative of the deterioration parameter of the aeronautical gas turbine engine, and wherein the step of modifying comprises modifying the amount of cooling capacity of the cooled cooling air system in response to the received data indicative of the deterioration parameter of the aeronautical gas turbine engine.

4. The method of claim 3, wherein the data indicative of the deterioration parameter comprises data indicative of a turbine blade inlet temperature, an exhaust gas temperature, or both.

5. The method of claim 1, wherein the step of receiving comprises receiving data indicative of the ambient condition of the aeronautical gas turbine engine, and wherein the step of modifying comprises modifying the amount of cooling capacity of the cooled cooling air system in response to the received data indicative of the ambient condition of the aeronautical gas turbine engine.

6. The method of claim 5, wherein the data indicative of the ambient condition comprises ambient temperature, ambient altitude, or both.

7. The method of claim 1, wherein the step of receiving comprises receiving data indicative of the operating condition of the aeronautical gas turbine engine, and wherein the step of modifying comprises modifying the amount of cooling capacity of the cooled cooling air system in response to the received data indicative of the operating condition of the aeronautical gas turbine engine.

8. The method of claim 1, further comprising receiving data indicative of a failure condition of the aeronautical gas turbine engine, and wherein the step of modifying further comprises modifying the amount of cooling capacity of the cooled cooling air system in response to the received data indicative of the failure condition of the aeronautical gas turbine engine.

9. The method of claim 1, wherein the flow of cooling fluid is a flow of bypass air, a fuel flow, a flow of thermal fluid from a thermal bus, a flow of ambient air, a flow bleed airflow, or a combination thereof.

10. The method of claim 1, wherein the CCA heat exchanger is integrated into a thermal bus, where the thermal bus further comprises a heat sink heat exchanger, and wherein the step of modifying further comprises modifying a flow of thermal fluid within the thermal bus to the heat sink heat exchanger, a temperature of the flow of thermal fluid within the thermal bus, or both.

11. The method of claim 1, wherein modifying the cooling capacity of the cooled cooling air system comprises modifying a hardware configuration of the engine to vary a cooling capacity of the cooled cooling air system, wherein modifying the hardware configuration comprises switching out one or more pieces of hardware on the engine to vary the cooling capacity of the cooled cooling air system.

12. The method of claim 1, wherein modifying the cooling capacity of the cooled cooling air system comprises modifying an amount of CCA airflow provided to a turbine section of the aeronautical gas turbine engine in response to the received data indicative of the ambient condition of the aeronautical gas turbine engine, data indicative of the deterioration parameter of the aeronautical gas turbine engine, data indicative of an operating condition of the aeronautical gas turbine engine, or the combination thereof.

13. An aeronautical gas turbine engine comprising:
a compressor section, a combustor section, and a turbine section in serial flow order;
a cooled cooling air system comprising a CCA heat exchanger in airflow communication with the compressor section and the turbine section, the cooled cooling air system configured for receiving airflow from the compressor section and providing a CCA airflow to the turbine section; and
a controller operably connected to the cooled cooling air system, the controller configured to
receive data indicative of an ambient condition of the aeronautical gas turbine engine, data indicative of a deterioration parameter of the aeronautical gas turbine engine, data indicative of an operating condition of the aeronautical gas turbine engine, or a combination thereof; and
modify an amount of cooling capacity of the CCA heat exchanger in response to the received data indicative of the ambient condition of the aeronautical gas turbine engine, data indicative of the deterioration parameter of the aeronautical gas turbine engine, data indicative of an operating condition of the aeronautical gas turbine engine, or the combination thereof;
wherein modifying the cooling capacity of the cooled cooling air system comprises modifying a cooling capacity of a cooling fluid provided to a CCA heat exchanger of the cooled cooling air system; and
wherein modifying the cooling capacity of the cooling fluid provided to the CCA heat exchanger of the cooled cooling air system comprises modifying an aspect other than temperature of a flow of the cooling fluid provided to the CCA heat exchanger of the cooled cooling air system.

14. An aeronautical gas turbine engine comprising:
a compressor section, a combustor section, and a turbine section in serial flow order;
a cooled cooling air system comprising a CCA heat exchanger in airflow communication with the compressor section and the turbine section, the cooled cooling air system configured for receiving airflow from the compressor section and providing a CCA airflow to the turbine section; and
a controller operably connected to the cooled cooling air system, the controller configured to
receive data indicative of a deterioration parameter of the aeronautical gas turbine engine; and
modify an amount of cooling capacity of the CCA heat exchanger in response to the received data indicative of the deterioration parameter of the aeronautical gas turbine engine;
wherein modifying the cooling capacity of the cooled cooling air system comprises modifying a cooling capacity of a cooling fluid provided to a CCA heat exchanger of the cooled cooling air system.

15. The aeronautical gas turbine engine of claim 14, further comprising:
a thermal bus, wherein the CCA heat exchanger is integrated into the thermal bus, where the thermal bus further comprises a heat sink heat exchanger, and wherein the step of modifying further comprises modifying a flow of thermal fluid within the thermal bus to the heat sink heat exchanger, a temperature of the flow of thermal fluid within the thermal bus, or both.

16. The aeronautical gas turbine engine of claim 14, wherein modifying the cooling capacity of the cooling fluid provided to the CCA heat exchanger of the cooled cooling air system comprises modifying a flow of the cooling fluid provided to the CCA heat exchanger of the cooled cooling air system.

* * * * *